United States Patent [19]

Athearn

[11] 4,212,930
[45] Jul. 15, 1980

[54] LITHIUM-HALOGEN BATTERIES

[75] Inventor: Lee F. Athearn, Fridley, Minn.

[73] Assignee: Medtronic, Inc., Minneapolis, Minn.

[21] Appl. No.: 20,809

[22] Filed: Mar. 15, 1979

[51] Int. Cl.² ............................................. H01M 2/26
[52] U.S. Cl. ..................................... 429/101; 429/181
[58] Field of Search ........................ 429/101, 178, 181

[56] References Cited

U.S. PATENT DOCUMENTS

| | | | |
|---|---|---|---|
| 3,817,791 | 6/1974 | Greatbatch et al. | 429/181 |
| 3,874,929 | 4/1975 | Greatbatch | 429/181 |
| 4,049,890 | 9/1977 | Schneider | 429/181 |
| 4,105,833 | 8/1978 | Greatbatch et al. | 429/178 |

Primary Examiner—Donald L. Walton
Attorney, Agent, or Firm—Schroeder, Siegfried, Ryan, Vidas, Steffey & Arrett

[57] ABSTRACT

Lithium-halide coatings for interior electrode lead portions in lithium halide batteries.

9 Claims, 4 Drawing Figures

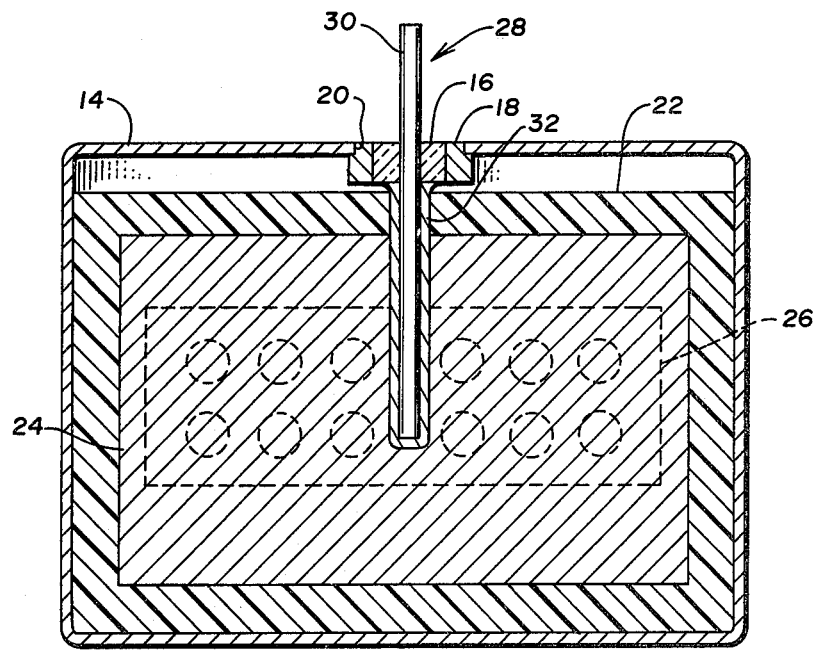
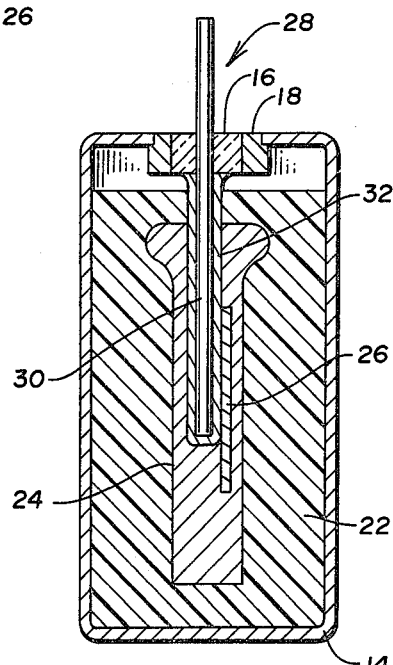
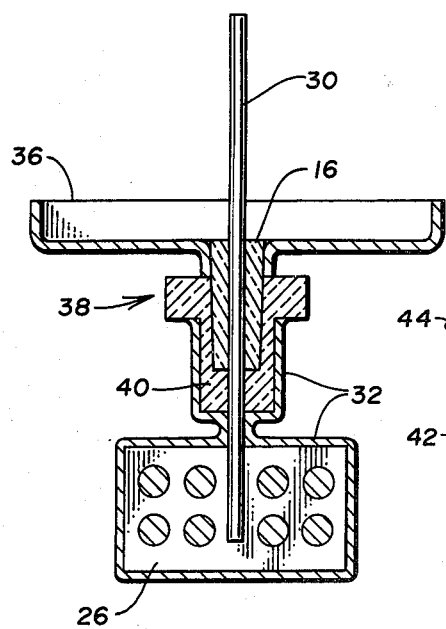
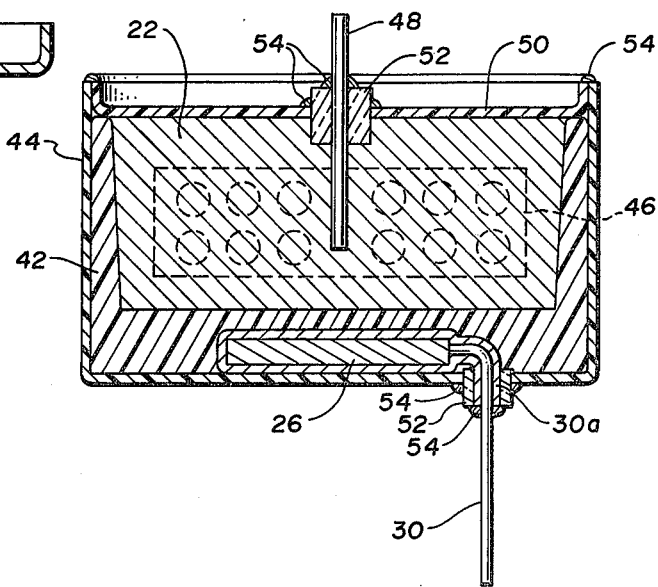

LITHIUM-HALOGEN BATTERIES

DESCRIPTION

Background of Prior Art

Encapsulated lithium-halogen batteries include a cathode comprised of a charge-transfer complex compound of iodine or other halogen combined with an organic constituent and a lithium anode. In these batteries, electrode lead wires extend from the interior of the battery through the battery casing to the exterior. The lead wires are ordinarily sealed to the battery casing at their entry point by an insulating glass seal or the like to hermetically seal the battery around the leads. Typically, in these batteries, the lithium anode is surrounded by the cathode material such as, for example, an iodine containing charge-transfer complex material, or the anode is arranged to enclose the cathode material. In such arrangements, the anode and cathode electrical leads must be suitably protected and insulated as they pass through the opposite electrode material. Unfortunately, areas where the leads of one electrode are exposed to the other electrode material are prime sites for corrosion and electrical shorts. For example, in Li/I batteries, many protective materials for anode leads are attacked by iodine in the cathode material.

Brief Summary of the Invention

It is a purpose of this invention to protect such electrode leads by forming a lithium halide coating on the portions inside the battery; the halide coating is electrically insulating and protects the electrode lead from chemical attack. In the case of a cathode lead wire passing through a lithium anode, the wire is coated with iodine or lithium iodide. If iodine is used, lithium iodide forms in situ. In the case of an anode lead wire passing through a cathode material which includes iodine, the wire is coated with lithium or with lithium iodide. If lithium is used, lithium iodide forms in situ. In each instance lithium iodide is provided initially or is formed in situ to protect and insulate the lead wire. In the in situ situation, it forms by reaction of an appropriate coating i.e., lithium or iodine for example, with the electrode material i.e., iodine component or lithium, through which the lead passes, to form the halide.

It is another purpose of the invention to provide a novel process for manufacturing lithium electrodes in which the electrodes are made by hot dipping the electrode collector into molten lithium. If the electrode lead is attached to the collector, the lead can be hot dipped along with the collector to provide the lithium coating on the lead. Even more preferably, if the feedthrough or at least an inner portion thereof is attached to the lead, the lead and collector assembly may be hot dipped in molten lithium to not only coat the collector but to coat the lead and seal it to the feedthrough with a lithium coating. A lithium coated collector may be used as an anode directly. If additional lithium is desired for the anode, the collector may be dipped repeatedly or pieces of lithium may be pressed onto the lithium coated collector.

BRIEF DESCRIPTION OF THE DRAWINGS

FIGS. 1 and 2 schematically show a battery of the lithium/iodine type in cross section, front and end elevations respectively, the cell including a protected anode lead wire according to one embodiment of the invention.

FIG. 3 schematically shows a header-lead-collector assembly in accordance with a preferred embodiment of the invention.

FIG. 4 schematically shows another type of battery construction using the invention.

DETAILED DESCRIPTION OF INVENTION

One aspect of this invention consists simply of coating the anode current collector and/or feedthrough/lead with a coating of lithium. The objective is to improve the reliability of the battery. If the cathode complex makes direct contact with the anode current collector, the cell may exhibit excessive self-discharge and/or a lowered cell voltage. Coating the current collector, lead and feedthrough with lithium makes such contact difficult. Lithium that is coated directly onto the feedthrough-lead-current collector assembly is well bonded. Lithium electrodes are often fabricated by pressing lithium foil on both sides of a current collector. In the event that the lithium delaminates, the current collector may be exposed. With a lithium coated current collector in such an arrangement, if the lithium foil delaminates, there is not a rapid catastrophic failure because the cathode complex merely contacts the lithium coating. Delamination of the lithium foil is also less likely with a lithium coated current collector because the lithium to lithium bond is usually stronger than that formed between the lithium foil and the metals usually used for the current collector. Another way that the cathode complex can reach the current collector is by moving along the feedthrough to the lead. This type of failure is unlikely with the lithium coated feedthrough-lead-current collector assembly of the invention because of the excellent bond of the lithium to the feedthrough.

FIGS. 1 and 2 are illustrative of a lithium/iodine battery construction in accordance with the invention. This particular battery includes a container or casing 14 which is preferably of stainless steel and which functions as the cathode contact. The casing has an opening generally indicated at 20 into which an electrical feedthrough 28 is hermetically sealed. A peripheral metal portion of ferrule 18 of the feedthrough is welded to casing 14 and glass 16 is sealed, as by fusing, to metal portion 18 and to electrode pin 30. The contents of the cell include a cathode 22 which takes the form usually of a pasty material comprised of an organic polymer such as poly-2-vinylpyridine which has been complexed with iodine to form an organic-iodine complex compound. Additional amounts of free iodine may also be included in such a material. The anode 24 of the cell consists of a body of lithium metal incorporating an anode collector 26 which is connected to electrical lead or pin 30. Electrical lead 30 includes an interior coating 32 covering pin 30 at least in those portions which pass through the cathode material 22. Cathode 22 is in direct contact with casing 14. Preferably, a continuous coating 32 will extend further along wire 30 all the way to the collector as shown.

Coating 32 is preferably initially lithium; about 1-2 mils thick is adequate. The lithium coating 32 starts reacting immediately with the iodine in the cathode material to form a lithium iodide coating in situ, where the lithium coating is contacted by the cathode material, in place of the initial lithium coating. As the lithium iodide is an electronic resistor it therefore insulates lead wire 30 preventing electrical shorts to the anode. Furthermore, the lithium iodide is chemically stable to both electrode materials and thus provides for a long life insulator around the electrode lead. Alternatively, lithium iodide coating can be initially placed on the pin.

The lithium coating may be formed on the anode lead by dipping it in molten lithium. As is well known, molten lithium must be maintained in a protective ambient atmosphere such as a helium atmosphere in a dry box. A single dipping usually forms a coating 1-2 mils thick.

The entire anode structure may be formed in this manner if desired as shown in FIG. 3. The anode lead pin 30 may be welded to the anode collector 26 and sealed to header 36 as shown to provide the feedthrough assembly, generally indicated at 38. Header 36 is a metal cap in this particular arrangement and also functions as the top lid of a metal container (not shown) similar to casing 14 of FIGS. 1 and 2, into which the battery contents are placed. The header is then welded to the container. Feedthrough assembly 38 includes glass seal 16 and an inner ceramic sleeve 40, such as alumina. The assembly is dipped into molten lithium one or more times to build up a lithium coating 32 on the collector the anode lead and the ceramic sleeve. Since the electrical feedthrough assembly is attached to the anode lead, the anode lead and collector are dipped so as to place the lithium coating on the ceramic sleeve to form a seal between it and pin 30. The collector may then be repeatedly dipped to provide additional lithium on it and to form the anode. Alternatively, sheets of lithium foil may be pressed onto the coated collector.

EXAMPLE 1

A lithium-iodine cell was assembled with a lithium coated feedthrough-lead-current collector assembly. The feedthrough consisted of an alumina sleeve with a nickel lead and nickel current collector. The feedthrough-lead-current collector assembly was coated with lithium by dipping the assembly into molten lithium. A pot of lithium was maintained at 375°-570° C. under an inert atmosphere. The assembly was dipped for a few seconds. The lithium coated the assembly and was well bonded thereto. The lithium actively reacted with the surface of the alumina making an excellent bond. Lithium foil was then pressed on each side of the lithium coated collector. The assembly was as shown in FIG. 3 and was encapsulated as shown in FIGS. 1 and 2.

EXAMPLE 2

A lithium-bromine cell was constructed which utilized a lithium coated feedthrough-lead-current collector assembly and a bromine cathode complex. The feedthrough consisted of a yttrium oxide ($Y_2O_3$) ceramic sleeve with a stainless steel lead and stainless steel current collector. The assembly had the same configuration and was coated in the same manner as Example 1. The lithium immediately began to react to form lithium bromide. Alternatively, lithium bromide may be used to form the coating initially.

EXAMPLE 3

A lithium-iodine cell was fabricated as shown in FIG. 4 which included a lithium coated anode current collector 26 and an electrode lead 30 having a lithium coating on the portion thereof interior to the battery, as at 30a. The current collector-lead was coated with lithium by dipping as in the other embodiments and then pressed beneath a layer of lithium 42 into a plastic cup 44, preferably of the fluorocarbon polymer type, to form the structure shown in FIG. 4. The fabrication of such a battery may be completed by filling the cup-shaped lithium anode 42 with the cathode material, such as a poly-2-vinylpyridine-iodine complex and additional iodine 22, inserting a cathode collector 46 having a cathode lead 48 attached thereto and closing the battery with a plastic lid 50. Lid 50 may also be of a fluorocarbon polymer. Both electrode leads are fitted with fluorocarbon polymer sleeves 52 and an adhesive, preferably one of the cynoacrylate types such as "Eastman 910" is applied to the various joints as indicated at 54 to seal the area around the leads and to seal lid 50 to plastic cup 44.

As mentioned hereinabove, if the battery is of the type in which the cathode is surrounded by the anode, the cathode lead may be coated with iodine as from a melt or by vapor deposition, to form by interaction with the lithium anode a protective coating of lithium iodide or lithium iodide may be coated on it directly from a melt or a water solution.

The other halogens i.e., chlorine and fluorine, iodine and bromine having been described hereinabove, may be used in the context of the invention although they are presently not as preferred. For example, in a battery having a lithium anode and a thionyl chloride electrolyte-cathode, a lithium chloride coating on the anode lead would be useful.

It should also be noted that one halogen may be used in the coating and another halogen used in the battery proper i.e., in the cathode or electrolyte when proper regard is given to the relative reactivity of the halogens being used. As can be seen from the periodic table, the halogens are listed, in decreasing reactivity, fluorine, chlorine, bromine and iodine. Consequently, one may use a lithium bromide coating in the presence of an iodine cathode or electrolyte. However, one would not use a lithium iodide coating in the presence of a bromine cathode or electrolyte since the bromine would react with the iodide. This can be generalized by saying that the halogen used in the coating must be the same one used in the cell cathode or electrolyte or it must be one of higher reactivity. Thus, if the cell cathode or electrolyte contains iodine; any of the halogens may be used to form the coating. If the cell contains bromine in the cathode or electrolyte, only bromine, chlorine or fluorine may be used to form the coating. If the cell contains chlorine in the cathode or electrolyte, only chlorine or fluorine may be used to form the coating. Lastly, if the cell cathode or electrolyte contains fluorine, only fluorine may be used to form the coating.

Generally, lithium has been used as an initial coating for anode leads herein, the lithium reacting with halogen present in the cathode or electrolyte to form a halide coating. However, the lead could also be completely formed of lithium rather than using a coating only. The halide would still form in situ. However, this is not preferred.

In many instances, the cells described above will be potted for use. For example, polyester resin or other thermosetting synthetic resins may be catalyzed to "set-up" within a reasonable time at room temperature without the evolution of a great deal of heat. Such potting materials are preferred.

Having described the invention, the exclusive rights and privileges thereto are to be defined by the following claims in the light of the foregoing description.

What is claimed is:

1. A lithium-halogen battery in which at least one of the electrical leads of at least one of the electrodes is provided, on at least a portion of its length, with a protective layer of a lithium halide.

2. The battery of claim 1 in which the lead is an anode lead.

3. The battery of claim 2 in which the coating is lithium initially and the halide is formed in situ.

4. The battery of claim 3 wherein the halide is lithium iodide.

5. The battery of claim 1 in which the lead is a cathode lead.

6. The battery of claim 4 in which the coating comprises iodine initially and lithium iodide is formed in situ.

7. The battery of claim 3 including a lithium anode comprising a lithium-coated collector and anode lead.

8. As a battery sub-assembly, an anode collector, an anode lead attached thereto and a feedthrough body attached to the anode lead, the subassembly including a lithium coating extending over the collector surface, the anode lead surface between the collector and the feedthrough body, the coating overlapping onto the feedthrough body.

9. The sub-assembly of claim 8 including a header to which the feedthrough body is attached and through which the lead extends.

* * * * *